United States Patent
Willms

(10) Patent No.: US 8,842,747 B2
(45) Date of Patent: Sep. 23, 2014

(54) METHOD FOR DIGITAL COMMUNICATION BETWEEN A PLURALITY OF NODES CONNECTED BY A SERIAL FIELD BUS AND CORRESPONDING SYSTEM, IN PARTICULAR A FIELD CONTROL SYSTEM OR FIELD SURVEYANCE SYSTEM

(75) Inventor: Hubert Willms, Neuss (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/813,538

(22) PCT Filed: Oct. 7, 2011

(86) PCT No.: PCT/EP2011/067586
§ 371 (c)(1),
(2), (4) Date: Feb. 27, 2013

(87) PCT Pub. No.: WO2012/045875
PCT Pub. Date: Apr. 12, 2012

(65) Prior Publication Data
US 2013/0148753 A1    Jun. 13, 2013

(30) Foreign Application Priority Data
Oct. 8, 2010    (EP) .................................... 10186945

(51) Int. Cl.
*H04L 27/00*    (2006.01)
*H04L 12/423*    (2006.01)
*H04L 12/413*    (2006.01)
*H04L 23/00*    (2006.01)
*H04L 12/40*    (2006.01)

(52) U.S. Cl.
CPC .............. *H04L 23/00* (2013.01); *H04L 12/423* (2013.01); *H04L 2012/40215* (2013.01); *H04L 12/4135* (2013.01); *H04L 12/40163* (2013.01)
USPC ............ 375/259; 375/260; 375/261; 375/265

(58) Field of Classification Search
CPC ......................... H04L 23/00; H04L 12/40163
USPC .................... 375/259, 260, 261, 265
See application file for complete search history.

(56) References Cited

U.S. PATENT DOCUMENTS 1,638,555 A * 8/1927 Wente ........................ 369/104
5,402,101 A   3/1995 Berger et al.
(Continued)

FOREIGN PATENT DOCUMENTS

DE    40 36 639 A1    5/1992
DE    198 50 869 A1   5/2000
(Continued)

OTHER PUBLICATIONS

PCT International Search Report, mailed Feb. 14, 2012, corresponding to International Application No. PCT/EP2011/067586.
(Continued)

*Primary Examiner* — Qutbuddin Ghulamali
(74) *Attorney, Agent, or Firm* — Husch Blackwell LLP

(57) ABSTRACT

The present invention provides, inter alia, a method for digital communication between at least one first node and a plurality of second nodes which are connected with the first node by a field bus. According to one aspect a highly effective presence detection scheme for checking the operational status of the second nodes by the first node is integratively combined with a message query for providing an effective first mode of digital communication between said nodes, which may be used very effectively to provide a communication channel which is independent of message priorities. According to another aspect the first mode of digital communication is combined with a second mode of digital communication which is based on message priorities of digital messages to be send by a respective second node to the first node. To advantage, a bitwise bus access arbitration mechanism may be used for implementing those modes of communication.

22 Claims, 3 Drawing Sheets

(56) References Cited

U.S. PATENT DOCUMENTS

| | | | |
|---|---|---|---|
| 5,600,684 A * | 2/1997 | Kuzma | 375/377 |
| 6,002,733 A * | 12/1999 | Kim | 375/377 |
| 2006/0197717 A1* | 9/2006 | Huyn | 345/13 |
| 2007/0067518 A1 | 3/2007 | Nichols | |
| 2008/0012691 A1 | 1/2008 | Lubben | |
| 2008/0101420 A1 | 5/2008 | Nichols | |
| 2008/0229084 A1* | 9/2008 | Wei et al. | 712/244 |

FOREIGN PATENT DOCUMENTS

| | | |
|---|---|---|
| DE | 10 2005 037 047 B3 | 12/2006 |
| DE | 10 2006 043 867 A1 | 4/2008 |
| DE | 10 2008 015 999 A1 | 10/2009 |
| DE | 10 2008 048 929 A1 | 4/2010 |
| EP | 0 191 239 A1 | 8/1986 |
| EP | 0 485 878 A2 | 5/1992 |
| EP | 0 929 056 A2 | 7/1999 |
| EP | 1 085 721 A2 | 3/2001 |
| EP | 1 917 651 A2 | 5/2009 |

OTHER PUBLICATIONS

PCT Written Opinion of the International Searching Authority, mailed Feb. 14, 2012, corresponding to International Application No. PCT/EP2011/067586.

PCT Notification Concerning Transmittal of International Report on Patentability corresponding to International Application No. PCT/EP2011/067586, mailed Apr. 18, 2013.

PCT International Preliminary Report on Patentabililty corresponding to International Application No. PCT/EP2011/067586, issued Apr. 9, 2013.

* cited by examiner

METHOD FOR DIGITAL COMMUNICATION BETWEEN A PLURALITY OF NODES CONNECTED BY A SERIAL FIELD BUS AND CORRESPONDING SYSTEM, IN PARTICULAR A FIELD CONTROL SYSTEM OR FIELD SURVEYANCE SYSTEM

The present invention generally concerns the digital communication between a plurality of nodes which are connected, preferably series connected, by a field bus. Typically, distributed components of a field control system or a field surveyance system, such as a hazard alert system, a building control system or a process control system, make up said nodes which have to communicate with each other via the field bus according to predefined protocols. This digital communication can be based on the so-called multi-master-concept or on the so-called master-slave-concept. Examples of field bus systems based on the multi-master-concept are the CAN-bus, the LONbus and the EIB-bus. Examples of field bus systems based on the master-slave-concept are the ASI-bus, the PROFI-bus, and systems as described in DE 40 36 639 C2 (corresponding to EP 0 485 878 B1 and U.S. Pat. No. 5,402, 101) and EP 0 191 239 A1. A highly relevant field bus based on the master-slave-concept is also the so-called ESSERBUS® of Novar GmbH (a Honeywell company), see www.esser-systems.de.

The ESSERBUS® and other relevant field bus systems as described in DE 40 36 639 C2 and EP 0 191 239 A1 already mentioned use as field bus a two-wire communication line which serves for connecting a plurality of client stations with a master station. The two-wire communication line not only serves for providing the communication link between these stations, but serves also for powering the client stations, so that no additional powering lines for providing electrical energy to the client stations are necessary. In this respect, it is further referred to DE 10 2005 037 047 B3 (corresponding to EP 1 917 651 B1 and US 2008/0012691 A1) and to DE 198 50 869 B4 as relevant prior art, which disclose inter alia bus user circuits of a client or participant station for communication with the master or central station via a two-wire communication line. Additionally, it is also referred to DE 10 2006 043 867 B4, DE 10 2008 015 999 A1, DE 10 2008 048 929 B4, and EP 0 929 056 B1 as general prior art in the context of hazard alert systems.

Versatile hazard alert systems, consisting of a master station and a plurality of client stations (e.g. 255 client stations, which are series connected by a field bus), typically communicate on the basis of a event-driven protocol which ensures that messages of high priority will be transmitted first. That works very well as long as the traffic on the bus is rather low, e.g. in fire alarm systems. In more complex systems, e.g. building control systems, the traffic on the bus is much higher, which can result in a substantial delay or even loss of messages of low priority. This problem can only be alleviated to a certain extent by increasing the processing speed and the communication bandwidth, which in any case would lead to the disadvantage of making respective components more expensive and being not compatible with existing respective infrastructure. This is even more the case since the amounts of information to be processed is increasing generally, so that the event-driven and priority-based message transmission and processing will involve the danger that messages of low priority are lost, even if high-speed communication and processing is realized.

Nevertheless, an event-driven protocol is generally to be preferred over a protocol which effects cyclic enquiries over all bus participants, since enquiries addressed to the participants who have no message to be send result in a loss of bus time. In simple fire alert systems message events generally occur only in low density, so that there will be no problems to obtain all messages from the bus participants. More difficult is the situation in intrusion alert systems and hazard alert systems fulfilling both functions where many messages may have to be send to the central station if an alert situation occurs. Even more demanding are the requirements with respect to processing and transmission speed for facility or building management systems and, in particular, for process control systems, which fulfill control function as well as alert functions. The central station has to receive respective event and status messages from the field in time for being able to calculate and command control reactions in agreement with respective requirements and fulfilling respective minimum reaction times.

As far as an event-driven protocol is used there is of course the need for providing efficient communication. EP 0 191 239 A1 and EP 0 485 878 B1 disclose a method of successive approximation which allows to select by defined number of selection steps one particular participant who is then enabled to send his message. The selection is based on a sequential interrogation using a sequencially repeated question-answer-scheme.

A bit-wise bus access arbitration which can be considered to implement a highly effective successive approximation or search for selecting a message for communication over the bus is known as such e.g. in the context of CANbus-technology. Also the so-called ESSERBUS-E1 (ESSERBUS® for intrusion alert systems) uses such an approach for selecting one participant for communication over the bus. In comparison with the successive approximation approaches using the question-answer-scheme a substantial reduction of necessary time to select the respective participant is achieved, since the participants read the result of the bit-wise communication of bits on the bus simultaneously within one bit-time interval.

Even in view of such improvements in event-driven communication protocols there remains the issue of safeguarding that no messages get lost or are unduly delaid, since also messages of low priority can be highly relevant for certain functions and control issues in a system which have to be fulfilled in a resonable time.

According to one topic, the present invention seeks to avoid the loss of messages in a distributed system, in which a plurality of stations are connected by a field bus.

Further, according to a second independent topic, the invention seeks to increase the efficiency of digital communication over a field bus in such a distributed system.

In view of at least one of said objects, the invention—according to a first independent aspect—provides a method for digital communication between at least one first node being a master node or a node in a master mode and a plurality of second nodes respectively being a slave node or a node in a slave mode and which are connected with the first node by a serial field bus supporting different physical field bus levels comprising a dominant physical field bus level and a recessive physical field bus level for representing logical values comprising logical ones and logical zeros of bits making up digital messages which are sent via the field bus, A1) wherein a respective node, for sending a digital message via said field bus to at least one other node, time-dependently manipulates the field bus, so that time-dependently assumed physical field bus levels represent the bits of said digital message, wherein at least the second nodes manipulate the field bus by bitwise setting or not setting the physical field bus level from the recessive physical field bus level to the dominant physical field bus level, A2) wherein the nodes, for reading digital messages sent via said field bus, detect time-dependently assumed physical field bus levels to read bits of a respective message, A3) wherein the second nodes are adapted to respond to predetermined digital messages read by sending a respective response message, wherein the method provides a first mode of digital communication between said nodes via said field bus with the following features and method steps:

B1) the/a first node sends a predetermined digital broadcast polling message of first type, B2) a plurality of second nodes is adapted to respond to the digital broadcast polling message of first type in synchronism by simultaneously sending a respective predetermined digital response message of first type, B3) the digital response messages of first type comprise at least one data word of predetermined bit length and each second node has associated at least one particular of the bits of said data word, so that each bit is associated to only one particular of said second nodes, and B4) the second nodes are adapted to send their respective response messages of first type to the first node by manipulating said physical field bus level with respect to said data word only for said at least one bit associated to the respective second node but not to manipulate said physical field bus level for bits of said data word associated to other second nodes, so that the first node reads one resulting digital response message of first type comprising a resulting data word of said predetermined bit length, wherein the bits of said resulting data word for which the respective logical value is represented by the dominant physical field bus level identify all second nodes having responded to the digital broadcast polling message of first type by setting the physical field bus level to the dominant physical field bus level with respect to said at least one bit associated to the respective second node and wherein for any second node not having read the digital broadcast polling message of first type or not being operational to communicate the logical value of the respective associated at least one bit is represented by the recessive physical field bus level.

According to the invention, the method further provides that:

C1) the second nodes are adapted to assume at least a first and a second operational state, wherein a second node assuming the first operational state and having read the digital broadcast polling message of first type sets its associated at least one bit to the dominant physical field bus level, to indicate its assuming of the first operational state to the first node, C2) a second node assuming the second operational state and having read the digital broadcast polling message of first type refrains from setting its associated at least one bit to the dominant physical field bus level, to indicate its assuming of the second operational state to the first node, C3) the first node is adapted to react to a resulting digital response message having a resulting data word of which at least one bit assumes the recessive physical field bus level according to a predetermined reaction schedule, which involves at least one of i) sending at least one predetermined further digital message via the field bus or sending at least one trigger signal by manipulating the field bus in a predetermined manner and ii) monitoring the field bus for digital information messages sent by second nodes assuming the second operational state.

The proposed method effectively provides a presence detection mechanism, on basis of which the first node determines which of the second nodes are operational to communicate with the first node via the field bus, in combination with the provision of an effective communication path between the second node and the first node which is not based on message priorities. This communication path provided by the first node of digital communication can be implemented with high time efficiency, so that the communication band of the field bus can be utilized to a high extent. In particular, the protocol overhead can be kept very low.

In principle, the second nodes assuming the second operational state could send the digital information messages according to a predefined schedule without further input or triggering from the first node, which might be practical in a multi-master-system, if it is provided that the nodes can indeed operate in synchronism, e.g. on basis of internal clocks, which are synchronized regularly, or/and triggered by a start bit or the like sent by a respective station. Another, preferred possibility is that the second nodes assuming the second operational state are adapted to monitor the field bus for responding to a respective further digital message or to a respective trigger signal by sending a digital information message.

Synchronized operation of the nodes is facilitated or safeguarded, if the first node is adapted to send synchronization signals to the second nodes by manipulating the field bus in the predetermined manner. In this case, the second nodes are preferably adapted to monitor the field bus for sending their predetermined digital response message of first type in synchronism on basis of a respective synchronization signal. Preferably, said synchronization signals sent by the first node serve as trigger signals on which said second nodes assuming the second operational state respond by sending a respective digital information message in a predetermined manner.

The efficiency of the digital communication according to the first mode is substantially increased, if the second nodes assuming the second operational state are adapted to read the resulting digital response message and to calculate from the resulting data word a response position in a response sequence defined by a predetermined response schedule, according to which each trigger signal in a sequence of consecutive trigger signals has associated at most one particular second node of those second nodes, for which the logical value of the respective associated at least one bit in the resulting data word is represented by the recessive physical field bus level, so that the second nodes assuming the second operational state send their respective digital information messages consecutively, each in response to one particular of said trigger pulses associated thereto.

In view of the issue of maximizing the communication efficiency it is further proposed that, according to said predetermined reaction schedule the first node sends a plurality of synchronization signals serving as trigger signals making up said sequence of consecutive trigger signals, with the number of trigger signals in said sequence corresponding to the number of bits in said resulting data word for which the logical value is represented by the recessive physical field bus level.

Preferably, the first node determines from the received digital information messages which of said second nodes, for which the logical value of the respective associated at least one bit in the resulting data word is represented by the recessive physical field bus level, are in the second operational state and which of said second nodes, for which the logical value of the respective associated at least one bit in the resulting data word is represented by the recessive physical field bus level, did not read the digital broadcast polling message of first type or are not operational to communicate. This achieves the mentioned presence detection. With the receipt of the digital information messages from the second nodes being in the second operational state, digital communication from said second nodes to the first node independently of any message priority was already achieved so that the first node may now process the respective digital information messages received from said second nodes being in the second operational state. Said digital information messages may comprise at least one of field sensor data, field status data and field alarm data.

For providing digital communication between the first node and many second nodes, the efficiency of digital communication can be increased if the plurality of second nodes is subdivided in a plurality of groups of second nodes, and that the method for digital communication according to the first mode is effected group-wise for one group after the other.

The method for digital communication according to the invention may provide a second mode of digital communication between said nodes via said field bus, which may be based on message priorities of digital messages to be sent by a respective second node to the first node, so that it can be ensured that messages of high priority will be transmitted first. To this end, it is proposed that:

D1) the/a first node sends a predetermined digital broadcast polling message of second type and wherein a plurality of second nodes is adapted to respond to the digital broadcast polling message of second type in synchronism by simultaneously sending a respective digital response message of second type comprising at least one data word of predetermined bit length, so that the first node reads one resulting digital response message of second type comprising at least one resulting data word of said predetermined bit length, D2) higher significant bits of said data word or at least one preceding data word of a respective digital response message of second type represent at least one of a message priority and a second node address or second node identification and lesser significant bits of said data word or at least one following data word of a respective digital response message of second type represent information data to be provided by the respective second node to the first node, D3) said second nodes send their respective response message of second type to the first node by manipulating the physical field bus level with respect to said data word bitwise in such a sequence that in the resulting time sequence of assumed physical field bus levels the field bus levels representing the logical values of said higher significant bits or said preceding data word precede the field bus levels representing the logical values of said lesser significant bits or said following data word, D4) for implementing a non destructive bitwise arbitration of message sending access of said second nodes to said field bus the second nodes read bitwise resulting bits from the field bus which make up the higher significant bits of a resulting data word or make up the bits of a resulting preceding data word and refrain from further manipulations of the field bus and from further message sending access to the field bus in response to the digital broadcast polling message of second type already read; if the logical value of a respective resulting bit read from the field bus deviates from the logical value of the respective bit of same significance of the data word of the response message of second type the respective second node was in the act of sending to the first node via the field bus.

The nondestructive bitwise arbitration has the effect that of the resulting data word of said predetermined bit length at least the higher significant bits correspond to the higher significant bits of the data word of at least one response messages of second type at least one of the second nodes has sent to the first node via the field bus. In case that a preceding and a following data word are used for providing the message priority and the information data, the same applies for the resulting preceding data word which shows itself on the bus and which corresponds to the preceding data word of at least one response message of second type at least one of the second nodes has sent to the first node via the field bus.

According to this proposal, a highly efficient sort of "successive search" or "successive approximation" is implemented, which may avoid the sequential interrogation and determining of one second node using a question-answer-schedule as known from EP 0 191 239 A1 (see pages 14 to 19, line 5, under the headlines "fast search facility" and "prioritised events") and EP 0 485 878 B1 on page 4, line 11, to page 7, line 6 under the headline "Unikatliste".

To achieve, that on basis of the non-destruction bitwise arbitration of message sending access only one second node is identified and successfully sends its digital response message of second type to the first node, it is proposed that of said higher significant bits of said data word of the respective digital response message of second type bits of higher significance represent the message priority and bits of less higher significance represent the unique second node address or unique second node identification. If plural data words are used for communication, at least two following data words may be included, comprising a data word representing the message priority and a data word representing the unique second node address or unique second node identification, which preferably follows the data word representing the message priority. The resulting bits as read by the first node identify one message priority, namely the highest priority of all messages which were to be send, and one particular second node which has sent those bits making up the priority information and the address or identification information, and this node is enabled for transmitting the rest of the digital response message of second type to the first node since all other second nodes refrain from further manipulations of the field bus and accordingly from further message sending access to the field bus in response to the digital broadcast polling message of second type which initiated the communication according to the second mode.

Again, it is possible that the synchronization of field bus access is achieved on basis of internal clocks without need for synchronization signals from the first node. However, it is preferred that the first node is adapted to send synchronization signals to the second nodes by manipulating the field bus in a predetermined manner, wherein the second nodes are adapted to monitor the field bus for sending their respective digital response message of second type or subsequent data words thereof in synchronism on basis of a respective synchronization signal.

Preferably, the first mode and second mode of digital communication are combined according to a polling schedule which allows that two corresponding communication channels are maintained persistently in an alternating manner, so that two redundant paths of communication are provided. To this end, it is proposed that the first node sends said digital broadcast polling message of first type and said digital broadcast polling message of second type subsequently according to a polling schedule, which involves in turn to send said digital broadcast polling message of second type at least once and subsequently to send said digital broadcast polling message of first type and to read the respective response message or response messages from said second nodes from the field bus after each digital broadcast polling message of respective first or second type according to the respective first or second communication mode before the next digital broadcast polling message of respective first or second type is sent.

Depending on the circumstances and requirements (and indeed generally preferred), plural digital broadcast polling messages of second type send subsequently may be followed by one digital broadcast message of second type, again followed by plural digital broadcast polling messages of second type send subsequently, and so on. Of course, it is also possible that one digital broadcast message of second type and one digital broadcast message of first type are send alternatingly.

Increased communication reliability can be achieved with respect to at least one, preferably both of said modes of communication on basis of check data, such as check sum data or cyclic redundancy check data. To this end, it is proposed that a respective digital information message sent by a second node assuming the second operational state according to the first mode of digital communication or/and a respective digital response message of second type sent by a second node according to the second mode of digital communication includes check data such as check sum data or cyclic redundancy check data, on basis of which the first node checks for uncorrupted message transmission from the respective second node to the first node. The communication reliability is particularly high, if the check data are calculated by the respective second node on basis of data representing its respective second node address or second node identification, so that the first node can also check for correct mapping between received messages and node address or node identification. To advantage, the digital information messages sent by a respective second node assuming the second operational state according to the first mode of digital communication may only include said check data, but not data representing the respective second node address or second node identification, so that the efficiency of communication is increased without loss or communication reliability.

The first node may process the respective digital information messages received from said second node being in the second operational state according to the first mode of digital communication. Further, the first node may process the information data of a respective digital response message of second type sent by a second node according to the second mode of digital communication. Said digital information messages or/and said information data preferably comprise at least one of fields sensor data, field status data and fields alarm data. Such nodes preferably belong to a field control system of field surveillance system, for example a hazard alert system, a building control system or a process control system.

In view of the topic to avoid a loss of messages of low priority mentioned above, the invention further provides, according to a second independent aspect, a method for digital communication between at least one first node being a master node or a node in a master mode and a plurality of second nodes respectively being a slave node or a node in a slave mode and which are connected with the first node by a serial field bus supporting different physical field bus levels for representing logical values comprising logical ones and logical zeros of bits making up digital messages which are sent via the field bus, a1) wherein a respective node, for sending a digital message via said field bus to at least one other node, time-dependently manipulates the field bus, so that time-dependently assumed physical field bus levels represent the bits of said digital message, A2) wherein the nodes, for reading digital messages sent via said field bus, detect time-dependently assumed physical field bus levels to read bits of a respective message, A3) wherein the second nodes are adapted to respond to predetermined digital messages read by sending a respective response message, wherein the method provides a first mode of digital communication between said nodes via said field bus and a second mode of digital communication between said nodes via said field bus, wherein the second mode of digital communication is based on message priorities of digital messages to be sent by a respective second node to the first node via said field bus, wherein the first mode of digital communication is not based on message priorities and provides an alternate communication path for digital messages to be sent by a respective second node to the first node via said field bus, wherein the first node sends a digital broadcast polling message of first type starting the communication according to the first mode of digital communication and a digital broadcast polling message of second type starting the second mode of digital communication subsequently according to a polling schedule, which involves in turn to send said digital broadcast polling message of second type at least once and subsequently to send said digital broadcast polling message of first type and to read the respective response message or response messages from said second nodes from the field bus after each digital broadcast polling message of respective first or second type according to the respective first or second communication mode before the next digital broadcast polling message of respective first or second type is sent.

Preferably, the first mode of digital communication additionally also provides a presence detection mechanism by which the first node determines which of said second nodes are operational to communicate with the first node via said field bus.

According to a third independent aspect, the invention further provides a method for digital communication between at least one first node being a master node or a node in a master mode and a plurality of second nodes respectively being a slave node or a node in a slave mode and which are connected with the first node by a serial field bus supporting different physical field bus levels for representing logical values comprising logical ones and logical zeros of bits making up digital messages which are sent via the field bus, a1) wherein a respective node, for sending a digital message via said field bus to at least one other node, time-dependently manipulates the field bus, so that time-dependently assumed physical field bus levels represent the bits of said digital message, A2) wherein the nodes, for reading digital messages sent via said field bus, detect time-dependently assumed physical field bus levels to read bits of a respective message, A3) wherein the second nodes are adapted to respond to predetermined digital messages read by sending a respective response message, wherein the method provides a first mode of digital communication between said nodes via said field bus and a second mode of digital communication between said nodes via said field bus, wherein the second mode of digital communication is based on message priorities of digital messages to be sent by a respective second node to the first node via said field bus, wherein the first mode of digital communication is not based on message priorities and provides a presence detection mechanism by which the first node determines which of said second nodes are operational to communicate with the first node via said field bus, wherein the first node sends a digital broadcast polling message of first type starting the communication according to the first mode of digital communication and a digital broadcast polling message of second type starting the second mode of digital communication subsequently according to a polling schedule, which involves in turn to send said digital broadcast polling message of second type at least once and subsequently to send said digital broadcast polling message of first type and to read the respective response or responses from said second nodes from the field bus after each digital broadcast polling message of respective first or second type according to the respective first or second communication mode before the next digital broadcast polling message of respective first or second type is sent.

In the context of both proposed methods (second and third independent aspect), the different physical field bus levels may comprise a dominant field bus level and a recessive physical field bus level, wherein at least the second nodes manipulate the field bus by bitwise setting or not setting the physical field bus level from the recessive physical field bus level to the dominant physical field bus level.

Depending on the circumstances and requirements (and indeed generally preferred), plural digital broadcast polling messages of second type send subsequently may be followed by one digital broadcast message of second type, again followed by plural digital broadcast polling messages of second type send subsequently, and so on. Of course, it is also possible that one digital broadcast message of second type and one digital broadcast message of first type are sent alternatingly.

Preferably, said first mode of digital communication between said nodes via said field bus according to both proposed methods (second and third independent aspects) is characterized by the following features and method steps:

B1) the/a first node sends a predetermined digital broadcast polling message of first type, B2) a plurality of second nodes is adapted to respond to the digital broadcast polling message of first type in synchronism by simultaneously sending a respective predetermined digital response message of first type, B3) the digital response messages of first type comprise at least one data word of predetermined bit length and each second node has associated at least one particular of the bits of said data word, so that each bit is associated to only one particular of said second nodes, and B4) the second nodes are adapted to send their respective response messages of first type to the first node by manipulating said physical field bus level with respect to said data word only for said at least one bit associated to the respective second node but not to manipulate said physical field bus level for bits of said data word associated to other second nodes, so that the first node reads one resulting digital response message of first type comprising a resulting data word of said predetermined bit length, wherein the bits of said resulting data word for which the respective logical value is represented by the dominant physical field bus level identify all second nodes having responded to the digital broadcast polling message of first type by setting the physical field bus level to the dominant physical field bus level with respect to said at least one bit associated to the respective second node and wherein for any second node not having read the digital broadcast polling message of first type or not being operational to communicate the logical value of the respective associated at least one bit is represented by the recessive physical field bus level.

If only presence detection is required (cf. third independent aspect), then said second nodes which have read said digital broadcast polling message of first type, set their associated at least one bit to the dominant physical field bus level, to indicate to the first node that the respective second node is operational to communicate via the said field bus.

If the alternate communication path shall be provided (second independent aspect), then said first mode of digital communication between said nodes via said field bus preferably is further characterized by the following features and method steps:

C1) the second nodes are adapted to assume at least a first and a second operational state, wherein a second node assuming the first operational state and having read the digital broadcast polling message of first type sets its associated at least one bit to the dominant physical field bus level, to indicate its assuming of the first operational state to the first node, C2) a second node assuming the second operational state and having read the digital broadcast polling message of first type refrains from setting its associated at least one bit to the dominant physical field bus level, to indicate its assuming of the second operational state to the first node, C3) the first node is adapted to react to a resulting digital response message having a resulting data word of which at least one bit assumes the recessive physical field bus level according to a predetermined reaction schedule, which involves at least one of i) sending at least one predetermined further digital message via the field bus or sending at least one trigger signal by manipulating the field bus in a predetermined manner and ii) monitoring the field bus for digital information messages sent by second nodes assuming the second operational state.

The second mode of digital communication may to advantage be based on a successive approximation mechanism which selects for reception by said first node at least one response message having associated the highest of all message pluralities of response messages to be sent by a respective second node to the first node. Preferably, said successive approximation mechanism may select, on basis of second node addresses or second node identifications, from a plurality of response messages having said highest message priority one particular response message originating from one particular second node for reception by said first node.

As successive approximation mechanism the method of successive approximation involving a sequential interrogation according to a question-answer-schedule as known from EP 0 191 239 A1 and EP 0 485 878 B1 may be used. However, for increasing the communication efficiency, it is preferred that said successive approximation mechanism comprises a non-destructive bitwise arbitration of message sending access of said second nodes to said field bus.

Preferably, said second mode of digital communication between said node via said field bus is characterized by the following features and method steps:

D1) the/a first node sends a predetermined digital broadcast polling message of second type and wherein a plurality of second nodes is adapted to respond to the digital broadcast polling message of second type in synchronism by simultaneously sending a respective digital response message of second type comprising at least one data word of predetermined bit length, so that the first node reads one resulting digital response message of second type comprising at least one resulting data word of said predetermined bit length, D2) higher significant bits of said data word or at least one preceding data word of a respective digital response message of second type represent at least one of a message priority and a second node address or second node identification and lesser significant bits of said data word or at least one following data word of a respective digital response message of second type represent information data to be provided by the respective second node to the first node, D3) said second nodes send their respective response message of second type to the first node by manipulating the physical field bus level with respect to said data word bitwise in such a sequence that in the resulting time sequence of assumed physical field bus levels the field bus levels representing the logical values of said higher significant bits or said preceding data word precede the field bus levels representing the logical values of said lesser significant bits or said following data word, D4) for implementing a/said non destructive bitwise arbitration of message sending access of said second nodes to said field bus the second nodes read bitwise resulting bits from the field bus which make up the higher significant bits of a resulting data word or make up the bits of a resulting preceding data word and refrain from further manipulations of the field bus and therefore from further message sending access to the field bus in response to the digital broadcast polling message of second type already read, if the logical value of a respective resulting bit read from the field bus deviates from the logical value of the respective bit of same significance of the data word of the response message of second type the respective second node was in the act of sending to the first node via the field bus.

The advantages discussed with respect to the corresponding realization of the method according to the first aspect of the invention are achieved.

All proposals with respect to the first mode of digital communication and with respect to the second mode of digital communication mentioned in the context of the discussion of the method according to the first independent aspect apply also to the methods according to the second and third independent aspect of the present invention.

The invention further provides a system, in particular a field control system or field surveillance system, for example a hazard alert system, a building control system or a process control system, comprising at least one first node being a master node or a node suitable for operating in a master mode and a plurality of second nodes respectively being a slave node or a node suitable for operating in a slave mode and which are connected with the first node by a serial field bus supporting different physical field bus levels comprising a dominant physical field bus level and a recessive physical field bus level for representing logical values comprising logical ones and logical zeros of bits making up digital messages which are sent via the field bus, said first node and said second nodes respectively are provided with communication hardware means and control means controlling said communication hardware means, said communication hardware means and control means being adapted for digital communication between said first node and said second node via the field bus. The system, according to the invention, is characterized in that said communication hardware means and control means and said field bus are adapted for digital communication between said first node and the respective second node via the field bus according to the method for digital communication provided by the invention according to the first independent aspect, as defined by at least one of claims 1 to 13 and preferably having additional features as mentioned above with respect to this aspect.

Further, the invention provides a system, in particular a field control system or field surveillance system, for example a hazard alert system, a building control system or a process control system, comprising at least one first node being a master node or a node suitable for operating in a master mode and a plurality of second nodes respectively being a slave node or a node suitable for operating in a slave mode and which are series connected with the first node by a serial field bus supporting different physical field bus levels for representing logical values comprising logical ones and logical zeros of bits making up digital messages which are sent via the field bus, said first node and said second nodes respectively are provided with communication hardware means and control means controlling said communication hardware means, said communication hardware means and control means being adapted for digital communication between said first node and said second node via the field bus. According to the invention, the system is characterized in that said communication hardware means and control means and said field bus are adapted for digital communication between said first node and a respective second node via the field bus according to the method for digital communication as provided by the invention according to the second or third independent aspect, as defined by at least one of claims 14 to 17 and preferably having additional features mentioned in at least one of claims 1 to 13 and preferably having also additional features as mentioned in the foregoing with respect to those aspects as well as with respect to the first aspect.

According to a preferred but non-limiting, only illustrative and exemplifying embodiment, a central station or unit (first node) requests all participant units or stations (second node, in particular sensor stations or/and actor stations) to transmit a priority byte and their unambiguous address in synchronism, with bit L being dominant. Because the bits of the priority byte and those of the address are transmitted in synchronism, plural L-bits result in a wired AND on the bus. Each participant reads back bit by bit all bits transmitted on the bus. If its transmitted bit and the bit read back are different that participant ceases its communication immediately, i.e. before the next bit is transmitted. After e.g. eight bits the central station will recognize the participant or participants which transmit messages of identical priority level and remain active for further communication. Next the address of one of those participants is selected by the same mechanism for sending its respective message to the central station. If this message selection denoted as "fast search" fails, the central station will nevertheless recognize all participants that want to transmit message using a presence detection mechanism which also provides a redundant second communication channel. The central station and the participant stations each contain software and hardware means which enable and follow the aforesaid communication protocol.

The invention and its independent aspects and the advantages achieved are further exemplified and illustrated in the following on basis of non-limiting embodiments which serve only as examples. It is referred to the following figures.

Figure 4:
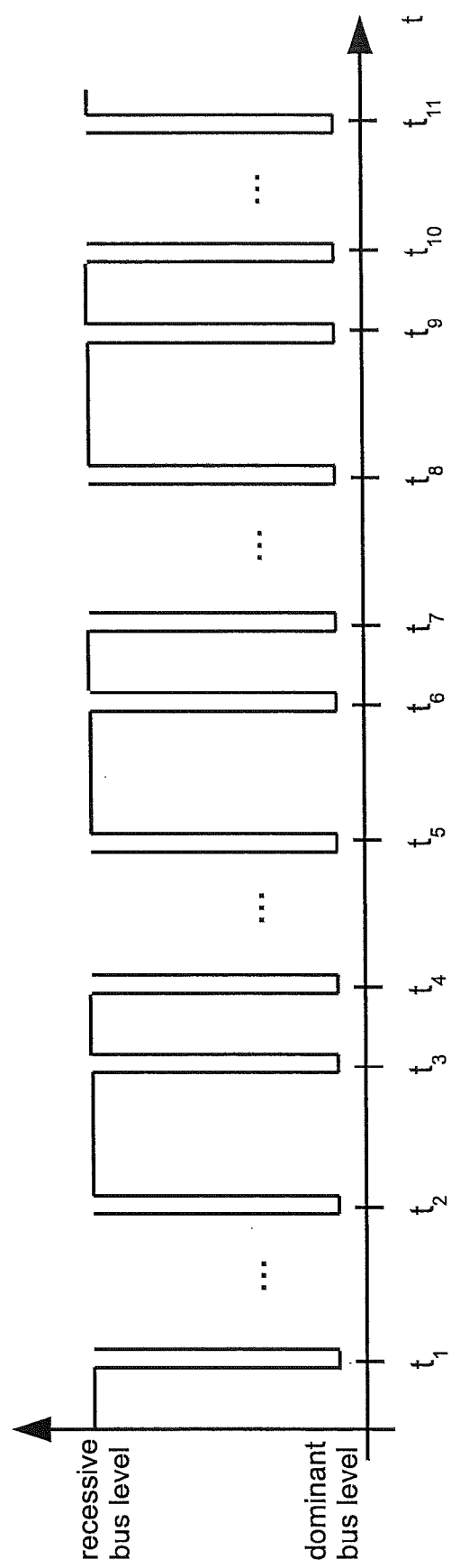

FIG. 4 shows schematically a sequence of physical field bus levels and change-overs between the recessive field bus level and the dominant field bus level caused by sending messages over the bus, said messages including the query message sent from the central station to the participant stations and responses from the participant stations which are synchronized by synchronization pulses sent by the central station.

In the following different modes of communication via a field bus between modes connected therewith are exemplified as illustrative examples. These modes can to advantage be used concurrently or alternatingly. The following description is based on embodiments of a system having those nodes and the field bus which again serves only as illustrative examples.

Figure 2:
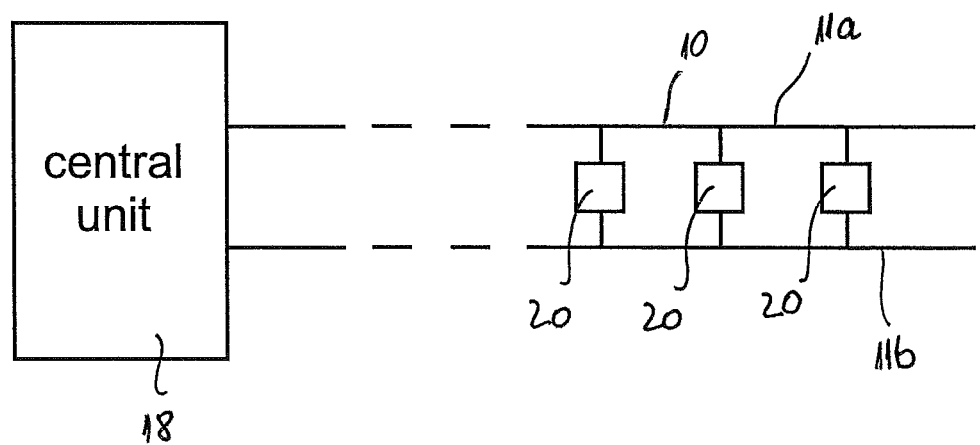
FIG. 2 shows diagrammatically several participant stations connected to a central station by means of a bus topology using a field bus with a two-wire communication line.
Figure 3:
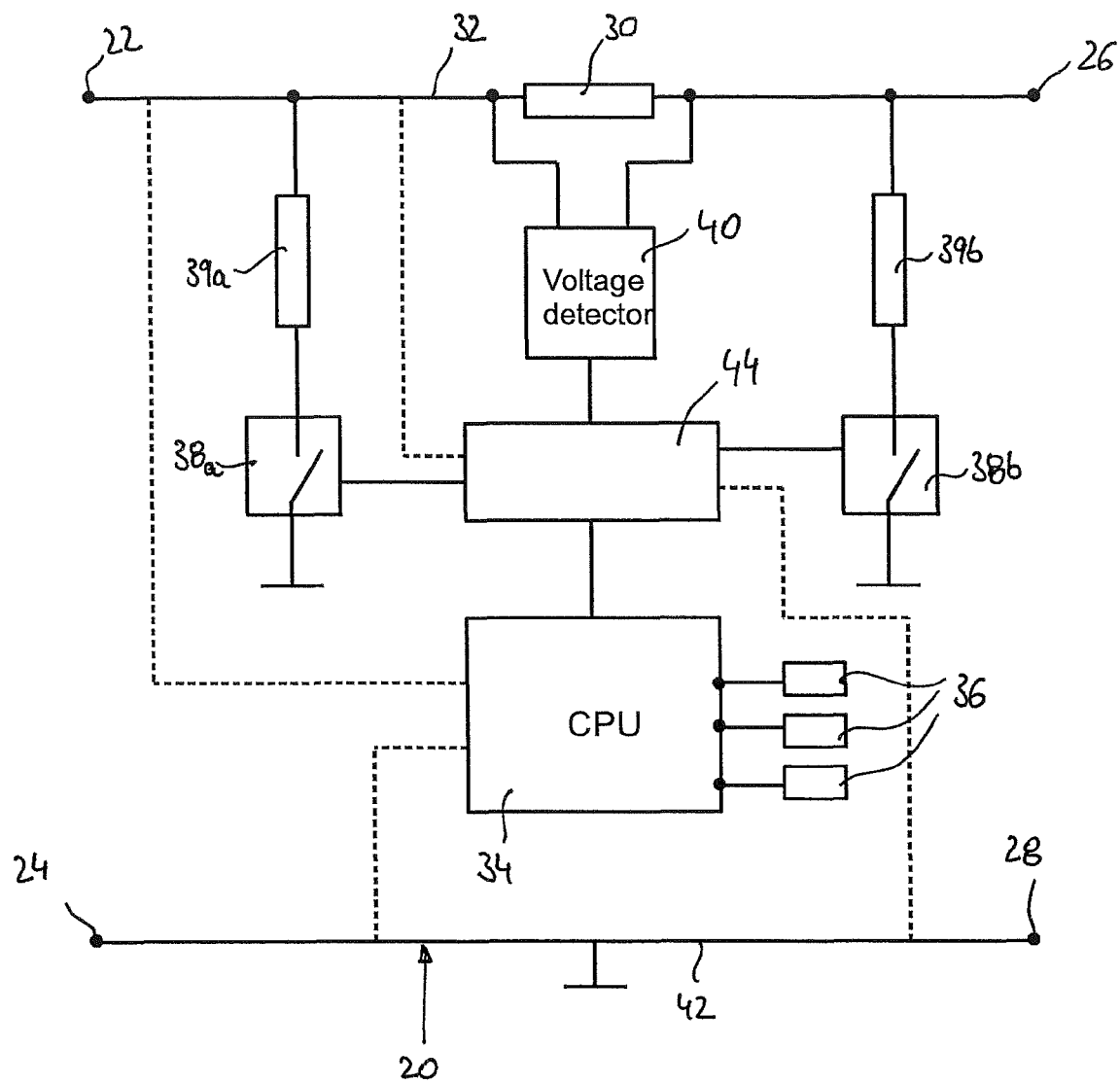
FIG. 3 shows schematically in block diagram form a typical participant station, incorporating a microcomputer and other components, for connection with a central station via a two-wire communication line.

An information transmission system such as used in hazard alert systems, facility management systems, in automotive applications and the like may have a central station and a plurality of connected participant station connected in parallel or in series with the central station for being controlled from the central station and for exchanging information therewith by means of digital messages send via a field bus. The configuration may be as shown in FIGS. 1 to 3.

A typical hazard alert system has up to 255 participant stations, which may also be denoted as bus user stations.

Typically the stations are connected in parallel with a signal line, which may serve also for current supply.

Figure 1:
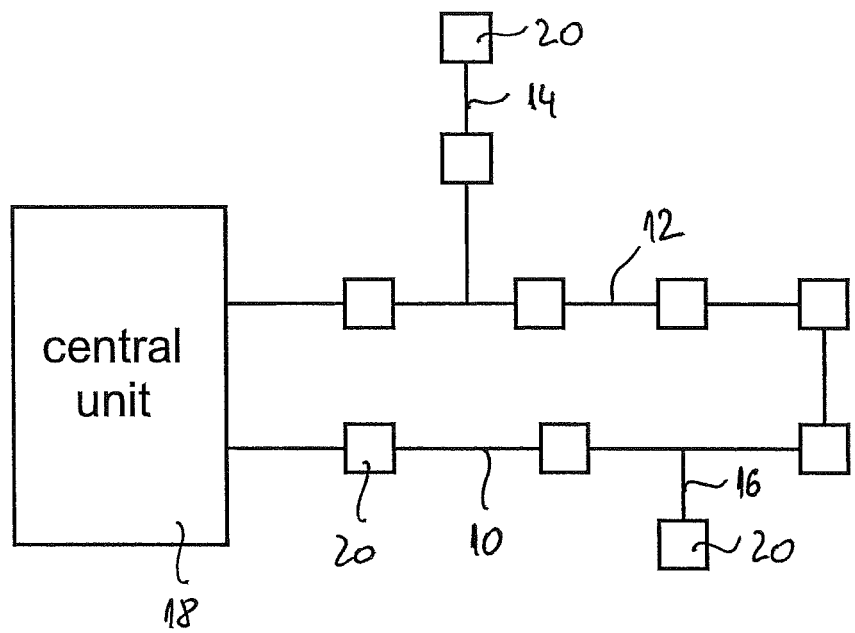
FIG. 1 shows diagrammatically a plurality of participant station ("second nodes") serially connected via a field bus to a central station ("first node") in a ring topology having two studs.

FIG. 1 shows a plurality of stations (nodes) which are connected with each other via a field bus 10. The field bus is arranged in a ring or loop topology having two studs, with a loop 12 and studs 14 and 16. The shown system is based on the master-slave-concept. A central station of a unit 18 which can also be denoted as "first node" and assumes the function of the master, controls a number of "slaves", namely a number participant stations 20, which can also be denoted as "second nodes" and are arranged in the loop 12 and the studs 14 and 16. The participants stations are connected in series or—alternatively—in parallel, via at least one communication line making up the field bus. Preferably (but not mandatory), a two-wire field bus is used, which may also serve to provide electrical power to the participant stations 20 from the central station 18. Generally the participant stations have at least one input, e.g. for receiving sensor data and the like or/and at least one output, e.g. for driving an actuator or effecting some sort of control with respect to a field device. There may be participant stations which have only a pass-through functionality for transmitting received data to the next-coming station.

FIG. 2 shows, how a number of participant stations 20 may be connected in parallel with the central station 18 by means of a two-wire communication line making up the field bus 10 and having lines or wires 11a and 11b and serving also for providing electrical power to the participant stations. Instead of providing the electrical power via the bus also a separate power supply may be implemented, or the bus may include at least one additional line just serving for power supply.

FIGS. 1 and 2 may be understood to exemplify two kinds of connecting the stations with each other, namely serially as illustrated in FIG. 1 and in parallel as illustrated in FIG. 2. Also the connection in parallel according to FIG. 2 can be implemented in a ring topology possibly having at least one stud. Also other topologies as known in the prior art can be implemented in the context of the present invention.

FIG. 3 shows a schematic block diagram of a participant station 20. The station has a first pair of terminals 22 and 24 and a second pair of terminals 26 and 28 which serve to connect one station with another station via a two-wire communication line e.g. in a ring topology possibly having one or several studs as shown in FIG. 1. Except for a series resistor 30 arranged in wire 32 between terminals 22 and 26 a parallel connection as exemplified in FIG. 2 is realized, with terminals 22 and 26 being associated to line 11a and terminals 24 and 28 being associated to line 11b.

The participant station of FIG. 3 includes a microprocessor 34 having connected at least one, in the shown example having connected three sensors or actuators. A respective sensor or actuator may be a separate device connected with the participant station 20 or may be an integral component said station. Of course, appropriate electronic circuitry such as driver circuits, digital to analogue converters and analogue to digital converters and the like may be provided.

For sending digital messages via the field bus a current drain 38a and a current drain 38b are provided and connected via a respective resistor 39a, 39b for current limitation on a respective side of series resistor 30 with communication line 32 connecting terminals 22 and 26, which are associated to bus line 11a (cf. FIG. 2). For receiving digital messages over the field bus a voltage detector 40 measures the voltage over series resistor 30, so that the measured voltage reflects the current through series register 30. The voltage detector together with series resistor 30 accordingly forms a current detector. The other wire 42 represents the reference potential, usually mass, and connects the terminals 24 and 28, which are associated to bus line 11b (cf. FIG. 2). The provision of a first and second line of the field bus connecting the terminals 24 and 28 of one participant station with a respective one of terminals 24 and 28 of the neighboring participant station allows also to provide electrical power to the respective participant station via the two field bus lines 11a, 11b, which is exemplified by doted lines connecting respective components of the participant station between the two field bus lines.

Microprocessor 34 controls a communication circuit 44, which receives input signals from voltage detector 40 and which drives the current drains 38a and 38b.

Concerning a sensor being part of the station or being connected with the station, typical examples are a smoke sensor, a heat sensor or a manually operable alarm switch. Other kinds of sensors may also be used. For further details of a suitable embodiment of a participant station allowing the implementation of the invention in its different aspects it is referred to EP 0 485 878 B1 and U.S. Pat. No. 5,402,101 and other prior art mentioned in the introductory part of the specification. In particular the known ESSERBUS® and system components of the ESSERBUS®-system are suitable as basis for the implementation of the invention.

An important issue is that the participant stations notify changes autonomously to the central station as detected at the respective inputs and outputs. For such time critical issues cyclical queries are less desirable. The outputs of the participant stations are controlled via control messages from the central station. However, participant stations may also effect control functions via their outputs themselves, e.g. in case of changes at their inputs, such as if a close-loop control is realized. Such changes and the control effected have to be notified to the central station. Because of the typically high number of participants, limited data transmission speed, data security and need for high reaction speed there is a requirement for highly efficient communication protocols.

In the following embodiments of approaches called "successive search", "fast search" and "presence detection" are described which serve for information transmittal. The description is based on non-limiting, illustrative and only exemplifying assumptions concerning the hardware of the participant stations, of the control station and the field bus which, however, in any case correspond to preferred embodiments.

Assumption 1:

The central station can modulate a voltage signal, which can be detected and understood by all participant stations. By digital modulation the participant stations can be addressed individually or groupwise or by a broadcast message to simultaneously address all participant station.

Assumption 2:

Each station can send a digital message in a point-to-point connection using current- or voltage modulation.

Assumption 3:

The central station has means for provide a synchronization signal via the field bus which is received by all participants stations and allows the participant stations to simultaneously send messages over the field bus in a synchronized manner.

Assumption 4:

According to assumption 3, all participant stations may send simultaneously data via the bus, which leads to collisions on the bus and requires arbitration by the hardware of the stations. To this end a bit wise arbitration on the bus line realizing a wired "AND" for the bit value chosen as dominant is assumed.

Assumption 5:

In the following, the bit value NULL (zero) is assumed to be the dominant physical field bus level for the hardware realizing the system. Further, it is assumed that the logical one is represented by the recessive physical field bus level, e.g. a high voltage level, and the logical zero is represented by the dominant physical field bus level, e.g. a low voltage level.

This means that in a simultaneously synchronized data transmission with bit wise superposition one NULL in one of the superimposed bits is sufficient to give the dominant level on the bus line. The successive level results only if all participating stations send a logical one for the respective bit.

EXAMPLE

| Byte 1: | 0111 0111 |
| Byte 2: | 0011 0111 |
| Byte 3: | 1101 0111 |
| Byte 4: | 1110 0111 |
| Arbitration result: | 0000 0111 |

The superposition of four data words in the form of byte 1 to byte 4 on the field bus leads to the resulting data word 0000 0111 which can be read from the field bus.

Assumption 6:

The hardware of the participant stations and the central station has means to bit wise read the bit value resulting from the bit superposition or bit wise arbitration and for processing the resulting bit value. Concerning the participant stations each participant station and its hardware is suitable to stop the communication immediately after having read a resulting bit, before the next bit would have to be send, so that the respective participant station is not affecting the bit arbitration result with the respect to the following bits. A respective participant station refrains from sending further bits if the detected resulting bit is different form the last bit which was send by this station.

Accordingly, the "wired AND"-bit superposition takes place separately for each bit. Each station sends its respective bit value, reads the resulting bit value on the bus, compares the resulting bit read with the bit sent and decides then either to continue with the digital communication by sending the next bit or refrains from further field bus manipulations.

The assumptions set forth in the preceding allow advantageously different modes of digital communication via a field bus as described in the following under the headlines "successive search", "fast search" and "presence detection".

Successive Search

A first example illustrates an approach for filtering a participant who will obtain the permission to send his message. For reasons of simplicity, a total number of eight participants is assumed. Further, it is assumed that the digital response message sent by the participant stations (second nodes) in response to a digital broadcast polling message of the central station (first node) includes one data word which represents the address of the second nodes. The second nodes are uniquely identified by their "short address", as depicted in the following table:

|  | Bit. 7 | Bit. 6 | Bit. 5 | Bit. 4 | Bit. 3 | Bit. 2 | Bit. 1 | Bit. 0 |
| --- | --- | --- | --- | --- | --- | --- | --- | --- |
| Short Address 0 | 0 | 0 | 0 | 0 | 0 | 0 | 0 | 0 |
| Short Address 1 | 0 | 0 | 0 | 0 | 0 | 0 | 0 | 1 |
| Short Address 2 | 0 | 0 | 0 | 0 | 0 | 0 | 1 | 0 |
| Short Address 3 | 0 | 0 | 0 | 0 | 0 | 0 | 1 | 1 |
| Short Address 4 | 0 | 0 | 0 | 0 | 0 | 1 | 0 | 0 |
| Short Address 5 | 0 | 0 | 0 | 0 | 0 | 1 | 0 | 1 |
| Short Address 6 | 0 | 0 | 0 | 0 | 0 | 1 | 1 | 0 |
| Short Address 7 | 0 | 0 | 0 | 0 | 0 | 1 | 1 | 1 |

The successive search is executed in 8 steps.

Step 1:

All eight participants send synchronously Bit.7 having the logical value zero. Each participant monitors the bus and checks if the sent bit corresponds to the bit he is reading from the bus. If booth values are identical, the respective node remains operational and participates in the subsequent filtering step(s). If both values are different, the node refrains from being operational, meaning that he is not sending bits on the bus any more. With respect to above table, since all participants have sent in their bit position Bit.7 a zero value, resulting in a zero value on the bus, all participants remain active/operational and participate in the next step.

Step 2:

All participants send synchronously Bit.6 having again the logical value zero. As in previously step, since the resulting value on the bus is zero, all participants still remain active by the end of step 2.

The same situation occurs also after step 3, step 4 and step 5.

Step 6:

All participants send synchronously Bit.2. Each participant monitors the bus and checks the result bit value on the bus. Since nodes 4 to 7 have each sent a logical one but the resulted value on the bus is zero, these four participants are reading a value that is different from the value they have sent on the bus. Therefore they refrain for being operational in the next communication step. Thus, by the end of iteration step 6 only four participants are active.
Step 7:

By the end of step 7 participant 2 and 3 are also eliminated since they have sent a logical one value but have read instead a logical zero value.
Step 8:

By the end of step 8 the participant with the short address of 1 is also eliminated. The participant which has the short address equal 0 is the only one participant that is left.

In case that there would have been more than one participant with the short address equal to 0, after the last step of the successive search method, all these participants would remain operational.

Exactly one participant remains operational only if the short addresses are unique. If the short addresses are ambiguous, and the same short address with the numerical smallest value (respectively numerical largest value, if logical value one is considered dominant) is assigned to several participants, all these participants remain operational by the end of the last step of the successive search method.

The above exemplified method of successive search can also be applied on a priority byte or priority data word included in the digital message to be send by a respective node. If successive search is applied only on the priority bytes of the participants, the situation may occur that, if all participants (or a respective number of participants) have messages with the highest priority, by the end of the successive search all (or a respective number of participants) participants are still operational, which in the present example could be up to 255 participants. However, normally only a much smaller number of participants having messages with the same (highest) priority would still operational by the end of the last step of the successive search method.

Thus, if after applying successive search to the priority bytes of the participants, several participants with highest priority messages are left, successive search may continue for the remaining participants by using their unique short addresses. The result would be that exactly one participant, namely the one which the highest priority message and the lowest short address, remains operational.

It should be noted that all participants begin to send their messages with the MSB (most significant bit) first, so that after every filtering step at most the half of the participants are eliminated. This are precisely those participants, which have a logical one in their corresponding actual bit position when at least one participant has a zero bit value in its respectively bit.

The above exemplified method ensures that after n steps (n being the length of the data word comprising the unique address or identification) exactly one participant is left, namely the one with the numerical smallest address value, respectively the one with the numerical largest value, in case of the logical value one being dominant.

Also in the case of the participants beginning to send their messages with the LSB (least significant bit) first, the uniqueness of the result is guaranteed, however without the result that the participant having the numerical smallest or highest address value remains operational. There would be no systematic which of the participants having to send a message of the highest priority is successful to send its message. Starting with the most, significant bit allows to allocate short addresses in such a manner to the second nodes that the chances of success to communicate with the central station correspond to the importance of respective functions with respect to controlling or monitoring the field. For example a participant station controlling a critical process can have a associated a short address of small numerical value so that this participant station will be successful in the bit wise bus arbitration with higher probability.

The master itself could participate to the above described process by actively sending messages, in principle. However this would normally make no sense, since he has to read the address of the winning participant, which has remained operative by the end of the successive search, and the complete message sent by the winning participant. Participants that are not actively sending can also read the address of the winning participant.

It is also conceivable that the result of the respective bit arbitration is communicated to the participants via an additional bit (mirror bit), or that a stuffing bit is added. In this case, however, the selection process would take longer.

It should be noted that a successive search approach for filtering a respective participant which is successful to be allowed to send his message can also be based on a data word-wise arbitration instead of a bit-wise arbitration, which requires more complex bus and bus communication hardware and may also require time.

Fast Search with Priority Controlled Message Query

This approach applies successive search in two rounds first over a priority byte and secondly over a short address.

The master sends cyclical to all participants the command "fast search". Each participant responds by sending a predetermined digital response message over the field bus, according to the embodiment assumed here after having received a synchronization signal. In a leading message part a priority byte is sent, which sets the priority of its message. A priority of zero represented by setting all bits of the priority byte to logical one may mean that a participant does not have to send a message, and that he is leaving the communication cycle. Since here may be several participants that have to send a message with equal priority, eventually by the end of the first application of the successive search filtering several participants might remain operational.

As mentioned, the responses of the participant stations on the command "fast search" may be synchronized by a synchronization signal sent by the master station by manipulating the field bus in predetermined manner, as is assumed for the embodiment considered here. Accordingly, the sending of the message including the priority byte may be triggered by the receipt of a synchronization signal by the participant stations. However, also other embodiments are conceivable, which need no synchronization by synchronization signals from the central station for being able to communicate simultaneously in a synchronized manner.

After the first application of the successive search filtering to the priority byte, all participants with the highest priority message are filtered, and remain operational concerning the communication started.

The second application of the successive search filtering now to the short address may effected in a separate communications cycle initiated again by the central station by sending a synchronization signal. However, it is also feasible that both filterings are effected in one communication cycle, in which one message is send or is to be send by the participant stations, which comprises in a leading message part the priority byte followed by the short address and may include the information part in a trailing message part. In any case, the successive search proceeds over the short address of the participants that are still operational after the first application of the successive search filtering.

In this disclosure here the following nomenclature is used. The different bytes or data words (one data word may be one byte or may comprise a plurality of bytes or any suitable number of bits) which belong to each other in that they identify the priority of one message, the identity of a particular participant station being the originator and the information content to be transmitted to the central station such as a sensor value or status byte, are all different parts of one message, even if these different parts are sent in response to separate subsequent synchronization signals. This nomenclature involves no technical features or differences over an alternative nomenclature which would regard those message parts to be different messages following one after the other and being associated to each other.

After the second application of the successive search filtering the central station knows the priority and the short address of the participant who is now entitled to send his information in a corresponding further message part, which in the example considered here is again initiated by a synchronization signal sent by the master.

Accordingly, concerning those messages to be sent from the participant stations to the central station, it is possible that all necessary information including the priority byte, the short address and the information part providing a sensor measurement value or the like is provided in one data word sent as one message, possibly initiated by the receipt of a synchronization signal from the central station. Another possibility, which was assumed in the foregoing, is that those parts, namely the priority byte, the short address and the information part including the sensor measurement value or the like are send in separate data words, each being initiated by a respective synchronization pulse from the central station. In the latter case one could consider the data words sent to be three separate messages, the first transmitting the priority, the second transmitting the address and the third transmitting the information part. In the context of the disclosure here instead all three data words sent in response to three separate synchronization pulses from the central station are considered to constitute one message sent by the respective participant station. Of course further messages sent by the participant remaining operational after the first and second application of the successive search filtering may follow, since in the master-slave-communication scheme considered here a participant station will only send in response to a calling message from the central station. Accordingly, as long as no other participant station is addressed by a calling message or a broadcast polling message, the communication protocol may provide that a respective participant station which remains operational after the successive search filtering is entitled to send several messages, e.g. if a number of different sensor measurement values have to be transmitted or if a sensor measurement value is to be send repeatedly, e.g. until a stop command, or another command addressed to another participant station or addressed to all participant stations is received.

FIG. 4 shows schematically the bus manipulations by the central station 18 and the participant stations 20 during the fast search communication mode. Shown is the physical bus level over time and the change-overs between the recessive bus level and the dominant bus level due to the bus manipulations by the respective communication hardware of the central station and of the client stations. The bus levels between $t_1$ and $t_2$ represent the fast search command sent by the central station. At time $t_3$ a synchronization pulse from the central station is to be seen. From time $t_4$ to $t_5$ the field bus levels representing the priority byte of the participant station message is shown, which is sent in response to the fast search commend and is triggered by the receipt of the synchronization signal. At time $t_6$ a further synchronization signal from the central station is shown which triggers the bus manipulations in the time interval between $t_7$ to $t_8$ which represent the address byte coding for the participant station short address. A further synchronization signal occurring at time $t_9$ triggers the sending of the information part of the message by the successful participant station surviving the fast search filtering in the time interval $t_{10}$ to $t_{11}$.

The data of the participant to be transmitted may be secured with a CRC (cyclic redundancy check) or with other check data. For keeping the amount of data to be transmitted small, the short address of a participant preferably is not transmitted again together with said data, but is included into the CRC. This leads also to additional transmission security, since the master can include the short address he had read during the successive search filtering into the data he is receiving for compute the new CRC to be compared with the received CRC. If the obtains the same CRC as the one transmitted by the participant the master knows that the transmission was successful, otherwise he can assume that a failure has occurred during transmission. In the first case the master sends, to the participant an acknowledgment that the data has been correctly received.

In case of a positive acknowledgment from the master, the participant can label his message as being successfully transmitted. If the participant does not receive such an acknowledgment from the master, it can assume that a failure has occurred during the transmission, and the participant will further try to send its message in the next communication cycle started with the command "fast search" from the central station.

According to the fast search approach described here, the addresses associated to the participant stations determine the chance of the respective station to be successful in the filtering, as far as the same message priorities are concerned. One may provide that a certain station which was successful does not participate in the next fast search communication round. An alternative would be that the participant stations increase the priorities assigned to a respective message to be send to the central station with the number of fast search rounds a respective participant station was not successful to send its message. There are many possibilities how a fine tuning of chances of successful communication can be effected.

To advantage, the fast search approach may be effected group wise by partitioning the participants (second nodes) into groups of second nodes, each group of second nodes being addressed individually by a "fast search" command identifying the respective group. Such an approach may be preferable for larger systems, so that the "fast search" is effected for one group after the other and accordingly the chances of successful priority based communication for a respective second node are increased.

Presence Detection with Combined Message Query

A second task of the master consists in cyclical checking the communication with all the participants, that is, checking whether the participants are operational.

A particularly fast form for checking the operational status of the participants is given by the capability of the participants to synchronously send a data word on the bus after having received a synchronization signal from the master. The following example illustrates this capability. It is assumed that the bus system comprises 16 participants.

With the command "communication query", which is sent by the master over the field bus, all the participants are requested, according to the present embodiment after they receive a further synchronization signal, to send a 16 bit data word as a predetermined digital response message on the bus.

Each bit of this respond message has a corresponding short address SA associated with it, as illustrated by the following table.

| Bit 15 | Bit 14 | Bit 13 | Bit 12 | Bit 11 | Bit 10 | Bit 09 | Bit 08 | Bit 07 | Bit 06 | Bit 05 | Bit 04 | Bit 03 | Bit 02 | Bit 01 | Bit 00 |
|---|---|---|---|---|---|---|---|---|---|---|---|---|---|---|---|
| SA 16 | SA 15 | SA 14 | SA 13 | SA 12 | SA 11 | SA 10 | SA 09 | SA 08 | SA 07 | SA 06 | SA 05 | SA 04 | SA 03 | SA 02 | SA 01 |

Here, the logical value zero represents again the dominant physical field bus level, while the logical value one represents the recessive physical field bus level. Each participant station manipulates only the bit position that has been assigned to it with its short address. All the other bits are set on the non-dominant/recessive level corresponding to a logical one. Accordingly, all participants, which from the perspective of the communication hardware send a 16 bit wide data word, are only allowed to manipulate the bit position corresponding to their respective short address. If at least one of the participants sends a logical zero, the physical field bus level is set to the dominant field bus level as illustrated by the following example:

| | |
|---|---|
| SA 16 is operational and sends: | 0111 1111 1111 1111 |
| SA 15 is operational and sends: | 1011 1111 1111 1111 |
| SA 14 is operational and sends: | 1101 1111 1111 1111 |
| SA 13 is operational and sends: | 1110 1111 1111 1111 |
| SA 12 is operational and sends: | 1111 0111 1111 1111 |
| SA 11 is operational and sends: | 1111 1011 1111 1111 |
| SA 10 is operational and sends: | 1111 1101 1111 1111 |
| SA 09 is operational and sends: | 1111 1110 1111 1111 |
| SA 08 is operational and sends: | 1111 1111 0111 1111 |
| SA 07 is operational and sends: | 1111 1111 1011 1111 |
| SA 06 is operational and sends: | 1111 1111 1101 1111 |
| SA 05 is operational and sends: | 1111 1111 1110 1111 |
| SA 04 is operational and sends: | 1111 1111 1111 0111 |
| SA 03 is operational and sends: | 1111 1111 1111 1011 |
| SA 02 is operational and sends: | 1111 1111 1111 1101 |
| SA 01 is operational and sends: | 1111 1111 1111 1110 |
| resulting data word: | 0000 0000 0000 0000 |

In the previous example all participants have send signals indicating they are operational for communication. The resulting data word comprises only zero bits and therefore the master who is also reading the data word can immediately recognize that all participants are operational.

As long as only the checking of the operational status of the participants is an issue, the participants available for communication will send a logical zero in their respective bit. Any participant who is not operational for communication e.g. because being out of order or not connected with the field bus anymore, will send no zero bit, so that the central station can identify those inoperational participants from the resulting data word, in which those inoperational participants are indicated by a logical one in the respective bit.

An additional communication channel can be provided if the presence detection is combined with a message query on basis of the following conventions: bits set to zero (dominant physical filed bus level) indicate that the respective participant station is operational and ready for communication if called for by the central station. Bits set to one (the recessive physical field bus level) indicates that the participant is either ready for communication and has to send a message to the central station or that the participant is not operational for communication.

Accordingly, if the central station reads a resulting data word having only zeros, the central station knows that all participant stations are ready for communication but presently have message to be transmitted to the central station. If however, one or several of the bits in the resulting data word are set to one, then the central station knows that there is at least one station which is not operational or/and that here is at least one station which is operational but has to send a message.

The following example illustrates such a scenario in which several participants are active and intend to send a message on the bus. In this case, upon receiving the communication query message from the master, these participants send in their corresponding bit position a logical one, which is also read by the master in the resulting data word. The master having been reading at least a logical one bit in the resulting data word, sets the communication cycle forth by generating as many synchronization signals as the number of one bits he had read in the resulting data word.

Assuming that the participants with the short addresses 1, 3, 5, and 6 have sent a bit with value one, the resulting data word is 0000 0000 0011 0101.

Upon reading the resulting data word, the master sends four synchronization signals on the bus. All the participants who have also been reading the resulting data word are now able to compute their sending position by using their short address.

1. SyncSignal: Bit.0: Short Address 1 is allowed to transmit
2. SyncSignal: Bit.2: Short Address 3 is allowed to transmit
3. SyncSignal: Bit. 4: Short Address 5 is allowed to transmit
4. SyncSignal: Bit.5: Short Address 6 is allowed to transmit If after the four synchronization signals all participants that have previously sent the logical one on the bus have sent their messages, the master can acknowledge the message reception to each participant and finish the communication cycle. The master knows which participants have to transmit after each of the synchronization signals. The short address of the participants may not be transmitted explicitly, but may be incorporated into the CRC that is used to secure the transmitted data. This has the effect that the amount of data to be transmitted is reduced.

It should be noted that the messages sent by the respective participant in response to the additional synchronization signals may already be those messages which those participants had to send to the master station. Accordingly, the presence detection is combined with a query for messages to be send to master and provides a communication channel which is not based on message priorities.

The bus manipulations effected by the central station and the participant stations in the communication mode described here are again exemplified on basis of FIG. 4 with reference to above example. The communication query command initiating this communication is represented in the field bus levels in the time interval $t_1$ to $t_2$. A synchronization signal send by the central station at time $t_3$ triggers the response from the participant stations giving there presence information and possibly need for communication information in one particular respective bit of the data word (two bytes) sent in the time interval $t_4$ to $t_5$. A further synchronization signal $t_6$ triggers the sending of the first information message from the participant station having short address 1 in time interval $t_7$ to $t_8$. The second participant station having short address 3 sends its information message after receipt of the next synchronization signal at time $t_9$ in the time interval $t_{10}$ to $t_{11}$. It follows a further synchronization signal for triggering the response from the participant station having short address 5 and a final synchronization signal of this communication round for triggering the respond from the participant stations having the short address 6. Of course, further communication between stations may follow which is synchronized by further synchronization signals.

If after a synchronization signal no participant has responded, the master can assume that either a communication failure has occurred or that the participant is not operational. Since the master knows the short address of the participant that did not answer, the master can directly address this participant to clarify its communication/operational status.

Assuming that all 16 participants have to send a message, the resulting data word read by the central station will comprise only ones. If a start bit is used with the transmitted data words the dominant physical field bus level will only be seen in the start bit. If, however, no of said assumed 16 participants is operation for communication, then no start bit will be seen on the bus. Accordingly, the use of a start bit can give additional information to the central station which can also evaluate the presence on non-presence of the start bit. If no start bit is used then there is no distinction between said to assumed cases. It is not necessary to use start bits, since the time interval between the synchronization signal and the first data bit may be predefined with sufficient precision.

The above described method that combines presence detection with message query is fast and has the advantage that the messages are sent on the bus independently of their priority as opposed to the fast search method.

In the following an alternate embodiment of the present method is described, for a larger system that involves more than 16 participants. Larger systems can be addressed by partitioning the participants (second nodes) into groups. For example, in a system with 255 participants a partition into 32 groups would be an adequate variant in which each group will comprise eight participants. The method for digital communication according to the embodiment is effected for each group in a successive manner, in the same way as in the previous embodiment, with the notably difference that the group number is send with each "communication query" polling message sent by the master. The following example illustrates this scenario, assuming the partition of the participants into groups is as follows:

Group 1: Short Address 0 to 7
Group 2: Short Address 8 to 15
Group 3: Short Address 16 to 23
   etc.
Group 31: Short Address 240 to 247
Group 32: Short Address 248 to 255

The assignment of short addresses to the respective bits is as follows:

| Group 1: | | | | | | | |
|---|---|---|---|---|---|---|---|
| Bit. 0 | Bit. 1 | Bit. 2 | Bit. 3 | Bit. 4 | Bit. 5 | Bit. 6 | Bit. 7 |
| SA 07 | SA 06 | SA 05 | SA 04 | SA 03 | SA 02 | SA 01 | SA 00 |

| Group 2: | | | | | | | |
|---|---|---|---|---|---|---|---|
| Bit. 0 | Bit. 1 | Bit. 2 | Bit. 3 | Bit. 4 | Bit. 5 | Bit. 6 | Bit. 7 |
| SA 15 | SA 14 | SA 13 | SA 12 | SA 11 | SA 10 | SA 09 | SA 08 |

| Group 3: | | | | | | | |
|---|---|---|---|---|---|---|---|
| Bit. 0 | Bit. 1 | Bit. 2 | Bit. 3 | Bit. 4 | Bit. 5 | Bit. 6 | Bit. 7 |
| SA 23 | SA 22 | SA 21 | SA 20 | SA 19 | SA 18 | SA 17 | SA 16 | etc.

| Group 31: | | | | | | | |
|---|---|---|---|---|---|---|---|
| Bit. 0 | Bit. 1 | Bit. 2 | Bit. 3 | Bit. 4 | Bit. 5 | Bit. 6 | Bit. 7 |
| SA 247 | SA 246 | SA 245 | SA 244 | SA 243 | SA 242 | SA 241 | SA 240 |

| Group 32: | | | | | | | |
|---|---|---|---|---|---|---|---|
| Bit. 0 | Bit. 1 | Bit. 2 | Bit. 3 | Bit. 4 | Bit. 5 | Bit. 6 | Bit. 7 |
| SA 255 | SA 254 | SA 253 | SA 252 | SA 251 | SA 250 | SA 249 | SA 248 |

After receiving the "communication query" polling message including the group number from the master, the eight participants of a group send simultaneously the respective predetermined digital response message, which comprises a data word of a predetermined bit length (here eight bits), wherein each second node has associated one particular of the bits of the data word. A second node sets its associated bit to the dominant physical field bus level (corresponding to a logical zero) to indicate that the nodes is operational. On the other hand is the node refrains from setting its associated bit to the dominant physical field bus level, the node indicates (or it is indicated "automatically" without any active involvement of said second node) that he is not operational, or the node actively indicates that he intends to send a message.

The communication continues with respect to the respective group as explained in the preceding example. The central station sends a number of synchronization pulses corresponding to the number of bits having logical value one in the data word read by the central station for triggering the respective participant stations to send their respective message. Thereafter, the communication may continue in the same manner for the next group of second nodes.

An important advantage of the illustrated presence detection approach including the query for messages is that the central station does not only check the operational status of the participant stations but that it is simultaneously also provided that the participant stations which have to send a message to do this in a very efficient way without substantial protocol overhead. Accordingly, a highly efficient communication channel is provided.

Combination of Fast Search and Presence Detection

Fast search and presence detection with message query can be combined to provide two redundant communication channels, one being based on message priorities or/and station addresses and the other not being based on priorities. Such a combination can be realized by an alternating repetition of both methods, whereby on the one hand it is ensured that high priority messages are transmitted first, while on the other hand it is avoided that lower priority messages are delayed for an undefined amount of time, since repeatedly messages of higher priority are send by other participant stations.

A solely application of fast search suffers from the problem that messages with lower priority may be never transmitted or may be transmitted only after too long delay, for they are suppressed by messages of higher priority. If presence detection allowing communication independently of message priorities is executed from time to time, these low priority messages are eventually transmitted. The maximal time a participant has to wait until being able to transmit his low priority message is given by the time between two execution of presence detection together with the duration of one presence detection cycle (in the worst case the participant has to wait till the next presence detection is executed and within one presence detection query the participant may have to wait till the last synchronization signal is sent by the master before obtaining permission to send his message).

Furthermore, presence detection with combined message query provides a redundant second communication channel, and enhance thus the safety and reliability of the communication system (e.g. a hazard alert system). If fast search fails, the central unit (i.e. the master) will nevertheless recognize by polling all participants, those that want to transmit a message, and will guarantee that these messages are also being transmitted. What is lost, however, is the advantage that messages with higher priority are sent before messages with lower priority.

Other way around, in case the presence detection with combined message query fails to function, fast search is nevertheless able to guarantee transmission of messages with highest priority, and, if message rate is below a threshold, to guarantee also the transmission of the remaining lower priority messages.

There are many possibilities, how the fast search and the presence detection with combined message query can be combined. For example, one could have a communication schedule, according to which those communication modes are used alternatingly. However, it is generally preferred that the "fast search" communication mode (also denoted as second mode of digital communication) is used several times one after the other followed then by effecting the "presence detection with message query" communication mode (also denoted as first mode of digital communication) once. The appropriate number of subsequent fast search queries dependent on the circumstances and environment of the respective communication system. For example, in a system such as an hazard alert system it will be more important to safeguard that all alert messages reach the master very fast, so that a higher number fast search queries should be effected one after the other before one presence detection with combined message query is effected. On the other hand in a field, control system, such as a process control system, or in a facility or building management system, it is more important that status information and control information is transmitted which does not have necessarily a very high priority, so that it might be advisable to provide for more frequent presence detection queries providing the second communication channel without regard to the message priority.

If the presence detection with message query is effected groupwise with respect to groups of participants, then the fast search and the presence detection may be effected interleaved, so that after having effected the presence detection with message query concerning one group of participants the fast search is effected at least once, to be followed by the presence detection with message query with respect to the next group of participants.

The present invention provides, inter alia, a method for digital communication between at least one first node and a plurality of second nodes which are connected with the first node by a field bus. According to one aspect a highly effective presence detection scheme for checking the operational status of the second nodes by the first node is integratively combined with a message query for providing an effective first mode of digital communication between said nodes, which may be used very effectively to provide a communication channel which is independent of message priorities. According to another aspect the first mode of digital communication is combined with a second mode of digital communication which is based on message priorities of digital messages to be send by a respective second node to the first node. To advantage, a bitwise bus access arbitration mechanism may be used for implementing those modes of communication.

The invention claimed is:

1. A method for digital communication between at least one first node being a master node or a node in a master mode and a plurality of second nodes respectively being a slave node or a node in a slave mode and which are connected with the first node by a serial field bus supporting different physical field bus levels comprising a dominant physical field bus level and a recessive physical field bus level for representing logical values comprising logical ones and logical zeroes of bits making up digital messages which are sent via the field bus, A1) wherein a respective node, for sending a digital message via said field bus to at least one other node, time-dependently manipulates the field bus, so that time-dependently assumed physical field bus levels represent the bits of said digital message, wherein at least the second nodes manipulate the field bus by bitwise setting or not setting the physical field bus level from the recessive physical field bus level to the dominant physical field bus level, A2) wherein the nodes, for reading digital messages sent via said field bus, detect time-dependently assumed physical field bus levels to read bits of a respective message, A3) wherein the second nodes are adapted to respond to predetermined digital messages read by sending a respective response message, wherein the method provides a first mode of digital communication between said nodes via said field bus with the following features and method steps:

B1) the first node sends a predetermined digital broadcast polling message of first type, B2) a plurality of the second nodes is adapted to respond to the digital broadcast polling message of first type in synchronism by simultaneously sending a respective predetermined digital response message of first type, B3) the digital response messages of first type comprise at least one data word of predetermined bit length and each second node has associated at least one particular of the bits of said data word, so that each bit is associated to only one particular of said second nodes, and B4) the second nodes are adapted to send their respective response messages of first type to the first node by manipulating said physical field bus level with respect to said data word only for said at least one bit associated to the respective second node but not to manipulate said physical field bus level for bits of said data word associated to other second nodes, so that the first node reads one resulting digital response message of first type comprising a resulting data word of said predetermined bit length, wherein the bits of said resulting data word for which the respective logical value is represented by the dominant physical field bus level identify all second nodes having responded to the digital broadcast polling message of first type by setting the physical field bus level to the dominant physical field bus level with respect to said at least one bit associated to the respective second node and wherein for any second node not having read the digital broadcast polling message of first type or not being operational to communicate the logical value of the respective associated at least one bit is represented by the recessive physical field bus level, characterized in that:

C1) the second nodes are adapted to assume at least a first and a second operational state, wherein a second node assuming the first operational state and having read the digital broadcast polling message of first type sets its associated at least one bit to the dominant physical field bus level, to indicate its assuming of the first operational state to the first node, C2) a second node assuming the second operational state and having read the digital broadcast polling message of first type refrains from setting its associated at least one bit to the dominant physical field bus level, to indicate its assuming of the second operational state to the first node, C3) the first node is adapted to react to a resulting digital response message having a resulting data word of which at least one bit assumes the recessive physical field bus level according to a predetermined reaction schedule, which involves at least one of i) sending at least one predetermined further digital message via the field bus or sending at least one trigger signal by manipulating the field bus in a predetermined manner and ii) monitoring the field bus for digital information messages sent by second nodes assuming the second operational state.

2. The method according to claim 1, wherein the second nodes assuming the second operational state are adapted to monitor the field bus for responding to a respective further digital message or to a respective trigger signal by sending a digital information message.

3. The method according to claim 2, wherein the first node is adapted to send synchronization signals to the second nodes by manipulating the field bus in a predetermined manner, and wherein the second nodes are adapted to monitor the field bus for sending their predetermined digital response message of first type in synchronism on basis of a respective synchronization signal, and wherein preferably synchronization signals sent by the first node serve as trigger signals, on which said second nodes assuming the second operational state respond by sending a respective digital information message in a predetermined manner.

4. The method according to claim 3, wherein the second nodes assuming the second operational state are adapted to read the resulting digital response message and to calculate from the resulting data word a response position in a response sequence defined by a predetermined response schedule, according to which each trigger signal in a sequence of consecutive trigger signals has associated at most one particular second node of those second nodes, for which the logical value of the respective associated at least one bit in the resulting data word is represented by the recessive physical field bus level, so that the second nodes assuming the second operational state send their respective digital information messages consecutively, each in response to one particular of said trigger pulses associated thereto.

5. The method according to claim 1, wherein the first node is adapted to send synchronization signals to the second nodes by manipulating the field bus in a predetermined manner, and wherein the second nodes are adapted to monitor the field bus for sending their predetermined digital response message of first type in synchronism on basis of a respective synchronization signal, and wherein preferably synchronization signals sent by the first node serve as trigger signals, on which said second nodes assuming the second operational state respond by sending a respective digital information message in a predetermined manner.

6. The method according to claim 1, wherein the second nodes assuming the second operational state are adapted to read the resulting digital response message and to calculate from the resulting data word a response position in a response sequence defined by a predetermined response schedule, according to which each trigger signal in a sequence of consecutive trigger signals has associated at most one particular second node of those second nodes, for which the logical value of the respective associated at least one bit in the resulting data word is represented by the recessive physical field bus level, so that the second nodes assuming the second operational state send their respective digital information messages consecutively, each in response to one particular of said trigger pulses associated thereto.

7. The method according to claim 6, wherein according to said predetermined reaction schedule the first node sends a plurality of synchronization signals serving as trigger signals making up said sequence of consecutive trigger signals, with the number of trigger signals in said sequence corresponding to the number of bits in said resulting data word for which the logical value is represented by the recessive physical field bus level.

8. The method according to claim 7, wherein the first node determines from the received digital information messages which of said second nodes, for which the logical value of the respective associated at least one bit in the resulting data word is represented by the recessive physical field bus level, are in the second operational state and which of said second nodes, for which the logical value of the respective associated at least one bit in the resulting data word is represented by the recessive physical field bus level, did not read the digital broadcast polling message of first type or are not operational to communicate.

9. The method according to claim 8, wherein the plurality of second nodes is subdivided in a plurality of groups of second nodes, with the method for digital communication according to the first mode of digital communication as defined by claim 1 being effected groupwise for one group after the other.

10. The method according to claim 1, wherein the first node determines from the received digital information messages which of said second nodes, for which the logical value of the respective associated at least one bit in the resulting data word is represented by the recessive physical field bus level, are in the second operational state and which of said second nodes, for which the logical value of the respective associated at least one bit in the resulting data word is represented by the recessive physical field bus level, did not read the digital broadcast polling message of first type or are not operational to communicate.

11. The method according to claim 1, wherein the plurality of second nodes is subdivided in a plurality of groups of second nodes, with the method for digital communication according to the first mode of digital communication as defined by claim 1 being effected groupwise for one group after the other.

12. The method for digital communication according to claim 1, wherein the method provides a second mode of digital communication between said nodes via said field bus with the following features and method steps:
- D1) the first node sends a predetermined digital broadcast polling message of second type and wherein a plurality of the second nodes is adapted to respond to the digital broadcast polling message of second type in synchronism by simultaneously sending a respective digital response message of second type comprising at least one data word of predetermined bit length, so that the first node reads one resulting digital response message of second type comprising at least one resulting data word of said predetermined bit length,
- D2) higher significant bits of said data word or at least one preceding data word of a respective digital response message of second type represent at least one of a message priority and a second node address or second node identification and lesser significant bits of said data word or at least one following data word of a respective digital response message of second type represent information data to be provided by the respective second node to the first node,
- D3) said second nodes send their respective response message of second type to the first node by manipulating the physical field bus level with respect to said data word bitwise in such a sequence that in the resulting time sequence of assumed physical field bus levels the field bus levels representing the logical values of said higher significant bits or said preceding data word precede the field bus levels representing the logical values of said lesser significant bits or said following data word,
- D4) for implementing a non destructive bitwise arbitration of message sending access of said second nodes to said field bus the second nodes read bitwise resulting bits from the field bus which make up the higher significant bits of a resulting data word or make up the bits of a resulting preceding data word and refrain from further manipulations of the field bus and therefore from further message sending access to the field bus in response to the digital broadcast polling message of second type already read, if the logical value of a respective resulting bit read from the field bus deviates from the logical value of the respective bit of same significance of the data word of the response message of second type the respective second node was in the act of sending to the first node via the field bus.

13. The method according to claim 12, wherein of said higher significant bits of said data word of a respective digital response message of second type bits of higher significance represent the message priority and bits of less higher significance represent the unique second node address or unique second node identification, or wherein at least two following data words are included, comprising a data word representing the message priority and a data word representing the unique second node address or unique second node identification, which preferably follows the data word representing the message priority.

14. The method according to claim 12, wherein the first node is adapted to send synchronization signals to the second nodes by manipulating the field bus in a predetermined manner, and wherein the second nodes are adapted to monitor the field bus for sending their respective digital response message of second type or subsequent data words thereof in synchronism on basis of a respective synchronization signal.

15. The method according to claim 12, wherein the first node sends said digital broadcast polling message of first type and said digital broadcast polling message of second type subsequently according to a polling schedule, which involves in turn to send said digital broadcast polling message of second type at least once and subsequently to send said digital broadcast polling message of first type and to read the respective response message or response messages from said second nodes from the field bus after each digital broadcast polling message of respective first or second type according to the respective first or second communication mode before the next digital broadcast polling message of respective first or second type is sent.

16. The method according to claim 1, wherein a respective digital information message sent by a second node assuming the second operational state according to the first mode of digital communication or/and a respective digital response message of second type sent by a second node according to the second mode of digital communication includes check data such as check sum data or cyclic redundancy check data, on basis of which the first node checks for uncorrupted message transmission from the respective second node to the first node.

17. The method according to claim 16, wherein the check data are calculated by the respective second node on basis of data representing its respective second node address or second node identification, wherein the digital information messages sent by a respective second node assuming the second operational state according to the first mode of digital communication preferably only includes said check data but not data representing the respective second node address or second node identification.

18. A method for digital communication between at least one first node being a master node or a node in a master mode and a plurality of second nodes respectively being a slave node or a node in a slave mode and which are connected with the first node by a serial field bus supporting different physical field bus levels for representing logical values comprising logical ones and logical zeroes of bits making up digital messages which are sent via the field bus,
- A1) wherein a respective nodes, for sending a digital message via said field bus to at least one other node, time-dependently manipulates the field bus, so that time-dependently assumed physical field bus levels represent the bits of said digital message,
- A2) wherein the nodes, for reading digital messages sent via said field bus, detect time-dependently assumed physical field bus levels to read bits of a respective message,
- A3) wherein the second nodes are adapted to respond to predetermined digital messages read by sending a respective response message,
- wherein the method provides a first mode of digital communication between said nodes via said field bus and a second mode of digital communication between said nodes via said field bus, wherein the second mode of digital communication is based on message priorities of digital messages to be sent by a respective second node to the first node via said field bus,
- wherein the first mode of digital communication is not based on message priorities and provides an alternate communication path for digital messages to be sent by a respective second node to the first node via said field bus,
- wherein the first node sends a digital broadcast polling message of first type starting the communication according to the first mode of digital communication and a digital broadcast polling message of second type starting the second mode of digital communication subsequently according to a polling schedule, which involves in turn to send said digital broadcast polling message of second type at least once and subsequently to send said digital broadcast polling message of first type and to read the respective response message or response messages from said second nodes from the field bus after each digital broadcast polling message of respective first or second type according to the respective first or second communication mode before the next digital broadcast polling message of respective first or second type is sent.

19. The method according to claim 18, wherein said second mode of digital communication is based on a successive approximation mechanism which selects for reception by said first node at least one response message having associated the highest of all message priorities of response messages to be sent by a respective second node to the first node and which preferably selects, on basis of second node addresses or second node identifications, from a plurality of response messages having said highest message priority one particular response message originating from one particular second node for reception by said first node.

20. The method according to claim 19, wherein said successive approximation mechanism comprises a non destructive bitwise arbitration of message sending access of said second nodes to said field bus.

21. A method for digital communication between at least one first node being a master node or a node in a master mode and a plurality of second nodes respectively being a slave node or a node in a slave mode and which are connected with the first node by a serial field bus supporting different physical field bus levels for representing logical values comprising logical ones and logical zeroes of bits making up digital messages which are sent via the field bus, A1) wherein a respective node, for sending a digital message via said field bus to at least one other node, time-dependently manipulates the field bus, so that time-dependently assumed physical field bus levels represent the bits of said digital message, A2) wherein the nodes, for reading digital messages sent via said field bus, detect time-dependently assumed physical field bus levels to read bits of a respective message, A3) wherein the second nodes are adapted to respond to predetermined digital messages read by sending a respective response message, wherein the method provides a first mode of digital communication between said nodes via said field bus and a second mode of digital communication between said nodes via said field bus, wherein the second mode of digital communication is based on message priorities of digital messages to be sent by a respective second node to the first node via said field bus, wherein the first mode of digital communication is not based on message priorities and provides a presence detection mechanism by which the first node determines which of said second nodes are operational to communicate with the first node via said field bus, wherein the first node sends a digital broadcast polling message of first type starting the communication according to the first mode of digital communication and a digital broadcast polling message of second type starting the second mode of digital communication subsequently according to a polling schedule, which involves in turn to send said digital broadcast polling message of second type at least once and subsequently to send said digital broadcast polling message of first type and to read the respective response or responses from said second nodes from the field bus after each digital broadcast polling message of respective first or second type according to the respective first or second communication mode before the next digital broadcast polling message of respective first or second type is sent.

22. A system, in particular a field control system or field surveillance system, for example a hazard alert system, a building control system or a process control system, comprising at least one first node being a master node or a node suitable for operating in a master mode and a plurality of second nodes respectively being a slave node or a node suitable for operating in a slave mode and which are connected with the first node by a serial field bus supporting different physical field bus levels, preferably comprising a dominant physical field bus level and a recessive physical field bus level, for representing logical values comprising logical ones and logical zeroes of bits making up digital messages which are sent via the field bus, said first node and said second nodes respectively are provided with communication hardware means and control means controlling said communication hardware means, said communication hardware means and control means being adapted for digital communication between said first node and said second node via the field bus, characterized in that said communication hardware means and control means and said field bus are adapted for digital communication between said first node and a respective second node via the field bus according to the method for digital communication of claim 1.

* * * * *